United States Patent
Gleason et al.

(10) Patent No.: US 6,308,125 B1
(45) Date of Patent: Oct. 23, 2001

(54) ADAPTIVE CLUTCH CONTROL OF A CLOSED-THROTTLE DOWNSHIFT

(75) Inventors: Sean E Gleason, Indianapolis; Jeffrey Kurt Runde, Fishers, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/569,172

(22) Filed: May 11, 2000

(51) Int. Cl.[7] .................................................. B60K 61/08
(52) U.S. Cl. ................................. 701/67; 701/68; 701/53; 701/54
(58) Field of Search ................................. 701/53, 54, 67, 701/68; 477/102, 120, 154, 155, 166, 180; 475/269, 86

(56) References Cited

U.S. PATENT DOCUMENTS

| | | | |
|---|---|---|---|
| 4,070,927 | 1/1978 | Polak | 475/286 |
| 4,665,772 | * 5/1987 | Greene | 74/335 |
| 4,671,139 | 6/1987 | Downs et al. | 477/148 |
| 4,913,004 | * 4/1990 | Panoushek et al. | 477/155 |
| 5,046,174 | 9/1991 | Lentz et al. | 701/60 |
| 5,046,383 | * 9/1991 | Butts et al. | 477/120 |
| 5,072,390 | 12/1991 | Lentz et al. | 701/60 |
| 5,079,970 | * 1/1992 | Butts et al. | 477/102 |
| 5,211,079 | 5/1993 | Runde et al. | 477/61 |
| 5,601,506 | 2/1997 | Long et al. | 475/120 |

* cited by examiner

Primary Examiner—William A. Cuchlinski, Jr.
Assistant Examiner—Marthe Y. Marc-Coleman
(74) Attorney, Agent, or Firm—Leslie C. Hodges (57) ABSTRACT

A closed-throttle downshift control adjusts engine torque to raise the input speed of a transmission to the synchronous speed of the target speed ratio, and adaptively adjusts clutch control parameters to coordinate the off-going clutch release and the on-coming clutch apply, and to complete the shift with minimum driveline torque disturbance. A primary on-coming clutch control fills the on-coming clutch and then raises the on-coming pressure when the input speed reaches the synchronous speed of the target speed ratio. If input synchronization cannot be maintained, a contingent control increases the on-coming clutch pressure to gradually re-establish the input speed synchronization and thereupon engage the on-coming clutch to complete the shift. The fill time or the maintenance pressure of the on-coming clutch is adaptively decreased for reduced driveline disturbance in subsequent shifts of the same type if the output shaft jerk during the primary control exceeds a threshold. Additionally, the fill time or the maintenance pressure of the on-coming clutch is adaptively increased based on an integral of the on-coming clutch slip for reduced dependence on the contingent control in subsequent shifts of the same type if an integral of the on-coming clutch slip during the contingent control exceeds a threshold amount.

10 Claims, 6 Drawing Sheets

FIG. 1

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

ADAPTIVE CLUTCH CONTROL OF A CLOSED-THROTTLE DOWNSHIFT

TECHNICAL FIELD

This invention relates to closed-throttle downshifting of an automatic transmission, and more particularly to an adaptive clutch control for synchronizing the transmission input speed with a target speed corresponding to the downshifted speed ratio.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset. Shifting from a currently established speed ratio to new speed ratio involves, in most cases, disengaging a clutch (off-going clutch) associated with the current speed ratio and engaging a clutch (on-coming clutch) associated with the new speed ratio.

The present invention is directed to downshifts, and in particular, to downshifts performed during coast or braking conditions with the engine throttle essentially closed, such shifts being referred to herein as closed-throttle downshifts. Various clutch controls have been proposed for controlling closed-throttle downshifting. For example, the U.S. Pat. No. to Lentz et al. 5,046,174 and U.S. Pat. No. Runde et al. 5,211,079 are directed to a control in which the off-going clutch is released, and the transmission input speed is raised to the synchronous speed of the target speed ratio by a closed-loop control of the on-coming clutch based on the deviation of the on-coming clutch slip from a desired slip profile. In another type of control, disclosed in the U.S. Pat. No. to Downs et al. 4,671,139, the off-going clutch is released after the transmission input speed falls below the engine idle speed, and the closed-throttle engine torque raises the input speed to the synchronous speed of the target speed ratio, whereupon the on-coming clutch is engaged.

While the control disclosed by Downs et al. has the potential of achieving high quality closed-throttle downshifts with no negative output torque disturbance, clutch and pressure control variability make it difficult to consistently achieve the desired timing for off-going clutch disengagement and on-coming clutch engagement. This is particularly the case for shifts occurring at very low vehicle speeds, such as the shift to the first or lowest speed ratio. Accordingly, what is needed is a control that produces consistent high quality closed-throttle downshifts in spite of such variability, and that has the ability to adaptively adjust the control parameters for achieving optimum shift quality.

SUMMARY OF THE INVENTION

The present invention is directed to an improved adaptive control for an automatic transmission closed-throttle downshift in which closed-throttle engine torque is used to raise the transmission input speed to the synchronous speed of the target speed ratio, wherein clutch control parameters are adaptively adjusted to coordinate the off-going clutch release and the on-coming clutch apply, and to tune the on-coming clutch controls for optimum shift quality.

A primary on-coming clutch control fills the on-coming clutch and maintains it in readiness for engagement while reducing the off-going clutch pressure to a hold value and then progressively reducing it to releasing the off-going clutch. When the input speed reaches the synchronous speed, the primary control raises the on-coming pressure by an amount designed to maintain the input speed synchronization. If the primary control is unable to maintain input speed synchronization, a contingent control schedules the on-coming clutch pressure for gradually re-establishing the input speed synchronization, and thereupon engages the on-coming clutch to complete the shift.

According to an aspect of this invention, the fill time or the maintenance pressure of the on-coming clutch is adaptively decreased for reduced driveline disturbance in subsequent shifts of the same type if the transmission shaft jark during the primary control exceeds a threshold. According to another aspect of this invention, the fill time or the maintenance pressure of the on-coming clutch is adaptively increased based on a measure of the effort required by the contingent control for reduced dependence on the contingent control in subsequent shifts of the same type if the measured effort exceeds a threshold level. According to a further aspect of this invention, the off-going clutch release control is adaptively adjusted for improved on-coming and off-going clutch coordination in subsequent shifts of the same type based on when off-going clutch slippage is observed relative to the fill period of the on-coming clutch. The reduced driveline disturbance, reduced over-shoot of the synchronous speed and the improved clutch coordination tune the control to provide optimum shift quality despite clutch and pressure control variability.

BRIEF DESCRIPTION OF THE DRAWINGS

FIGS. 6A and 6B pertain to adaptive parameter measurement during the primary control, and FIG. 6C pertains to adaptive parameter measurement during the contingent control.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figure 1:
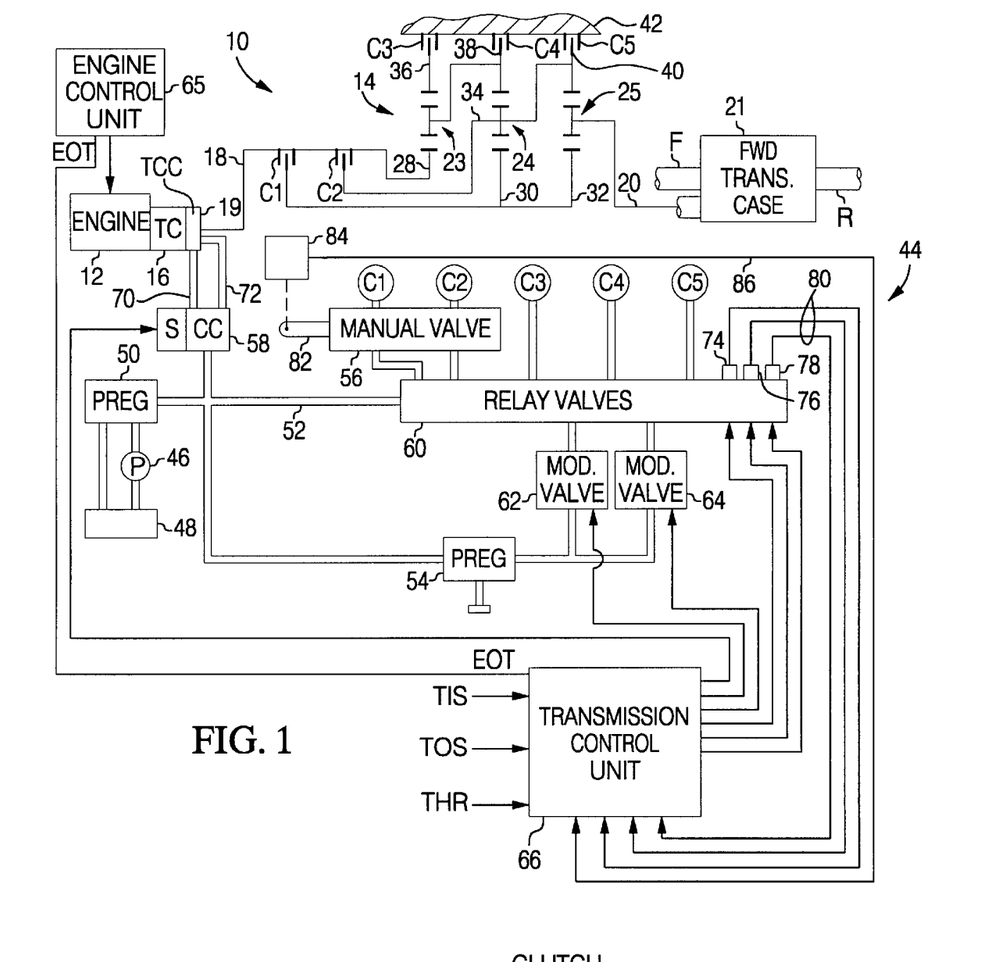
FIG. 1 is a diagram of an automatic transmission and microprocessor-based control unit for carrying out the control of this invention.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

Figure 2:
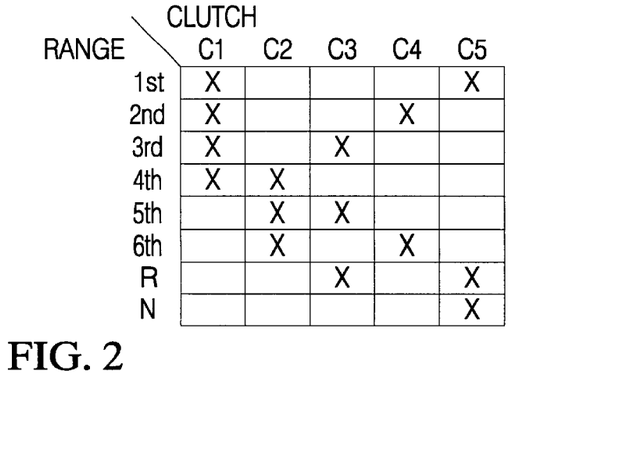
FIG. 2 is a table indicating a relationship between transmission clutch activation and corresponding speed ratio.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the second forward speed ratio is established when clutches C1 and C4 are engaged. Shifting from one speed forward speed ratio to another is generally achieved by disengaging one clutch (referred to as the off-going clutch) while engaging another clutch (referred to as the on-coming clutch). For example the transmission 14 is downshifted from second to first by disengaging clutch C4 while engaging clutch C5.

The torque converter clutch 19 and the transmission clutches C–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on depending on the control variables afforded by engine 12, and the transmission control unit 66 controls the solenoid operated fluid control valves 58–64 based on a number of inputs to achieve a desired transmission speed ratio. The transmission control unit inputs include signals representing the transmission input speed TIS, an engine throttle setting THR, and transmission output speed TOS. Sensors for developing such signals may be conventional in nature, and have been omitted for simplicity. Additionally, the engine control unit 65 supplies an engine output torque signal EOT to transmission control unit 66.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for engaging and/or disengaging the respective clutches C1–C5, develops corresponding force motor current commands, and then supplies current to the respective force motors in accordance with the current commands.

The present invention is directed to an improved control strategy for closed-throttle downshifts which ensures shift completion with minimum driveline torque disturbance and adaptively adjusts the control parameters to achieve consistent high quality shifting in spite of clutch and pressure control variations. As in the aforementioned U.S. Pat. No. to Downs et al. 4,671,139, the control of this invention releases the off-going clutch when the input speed TIS is less than the engine speed ES, and utilizes the closed-throttle engine torque to raise TIS to the synchronous speed (SYNC) of the target speed ratio. However, the present invention utilizes a combination of primary and contingent controls to ensure that the shift will be completed with minimum driveline torque disturbance, and adaptively adjusts the control parameters to enhance shift quality and improve the ability of the primary control to maintain input speed synchronization in subsequent shifts of the same type. The primary control involves filling the on-coming clutch and maintaining it in readiness for engagement, while dropping the off-going clutch pressure to a hold value, and then progressively reducing it to release the off-going clutch. When TIS reaches SYNC, the primary control raises the on-coming pressure by a predetermined amount (AP) designed to produce sufficient on-coming clutch torque capacity to maintain the input speed synchronization. If the primary control cannot maintain the input speed synchronization (due to clutch parameter variability, for example), the contingent control is initiated to re-establish input speed synchronization. The contingent clutch control includes a first open-loop stage that progressively increases the on-coming clutch pressure to gradually re-establishing the input speed synchronization, and a second closed-loop stage that adjusts on-coming clutch pressure to conform TIS to a defined trajectory. In any event, the on-coming clutch is fully engaged to complete the shift when input speed synchronization is established.

The fill time or the maintenance pressure of the on-coming clutch is adaptively decreased for reduced driveline disturbance in subsequent shifts of the same type if the transmission shaft jerk during the primary control exceeds a threshold. On the other hand, the fill time or the maintenance pressure of the on-coming clutch is adaptively increased based on a measure of the effort, if any, required by the contingent control; if the measured effort exceeds a threshold, the adaptive adjustments improve the ability of the primary control to maintain the input speed synchronization and reduce dependence on the contingent control in subsequent shifts of the same type. Additionally, the off-going clutch release control is also adaptively adjusted for improved oncoming and off-going clutch coordination.

Figure 3:
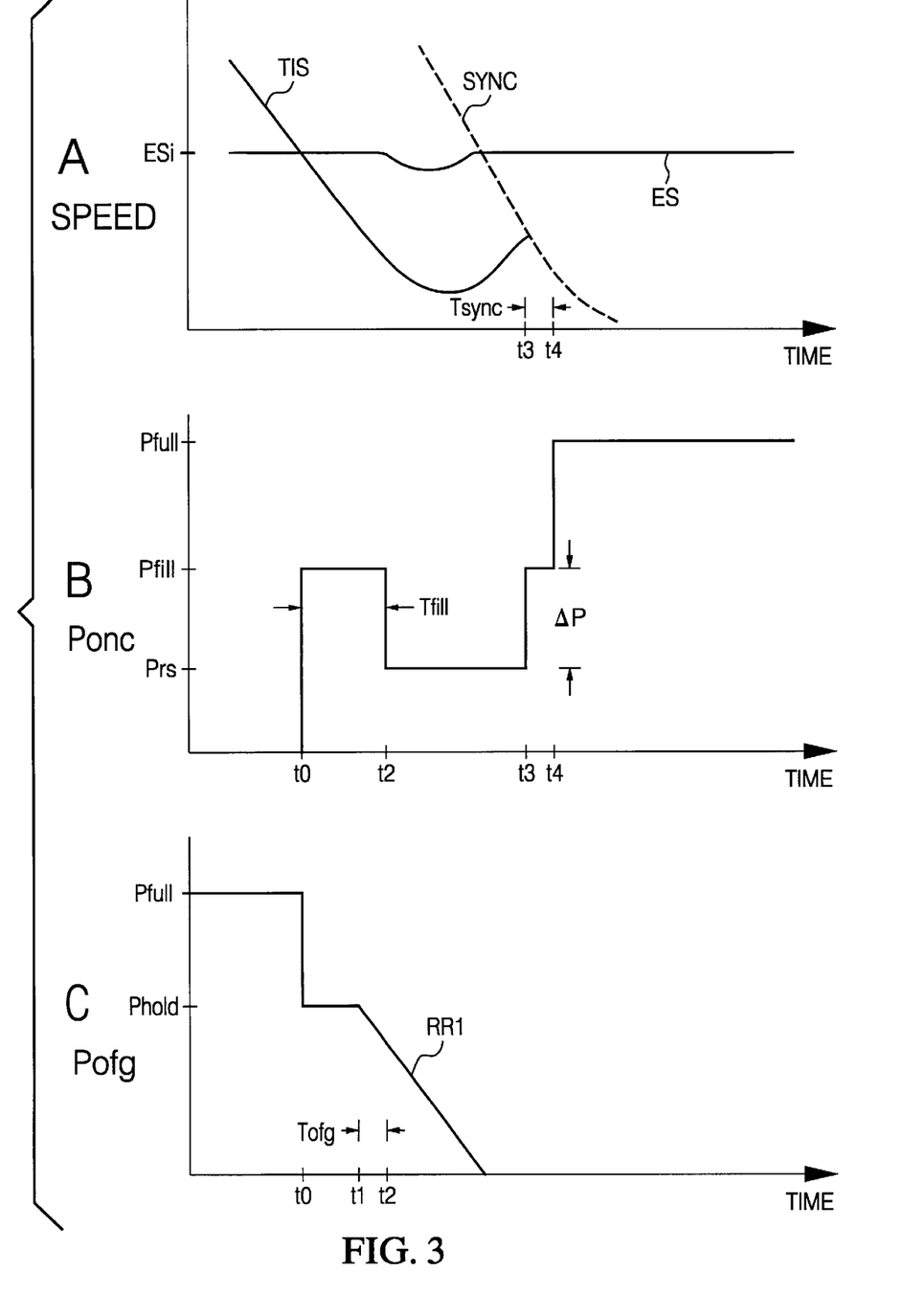
FIG. 3, Graphs A, B and C, graphically depict a closed-throttle downshift using only a primary on-coming clutch control.

FIG. 3 graphically depicts a second-to-first closed-throttle downshift carried out with the primary control. Referring to FIG. 3, Graph A depicts both engine speed ES and transmission input speed TIS, Graph B depicts the commanded on-going clutch pressure Ponc, and Graph C depicts the commanded off-coming clutch pressure Pofg. The downshift is initiated at time t0 when the vehicle has slowed to the point that the speed TIS of input shaft 18 is approaching the engine speed ES, which is shown as having a substantially constant idle value ESi. Shift initiation involves increasing Ponc to a relatively high value designated in Graph B as Pfill, and reducing Pofg to a hold pressure Phold sufficient to maintain engagement of the off-going clutch. The pressure command Ponc is maintained at Pfill for a determined fill interval Tfill (t0–t2) to ready the on-coming clutch for engagement, after which Ponc is reduced to a pre-defined return spring (or maintenance) pressure Prs designed to maintain the on-coming clutch in readiness for engagement. Various control methods may be used to adaptively determine the fill interval Tfill; see, for example the U.S Pat. No. 5,072,390 to Lentz et al., issued on Dec. 10, 1991, and incorporated herein by reference, and also the co-pending U.S. Pat. application Ser. No. 09/566,713, filed on May 9, 2000, both of which are assigned to the assignee of the present invention. As the on-coming clutch fills in preparation for engagement, the input speed TIS continues to fall as shown in Graph A. At time t1 (defined as a predetermined time Tofg prior to the end of the on-coming clutch fill interval Tfill), Pofg is released at a pre-defined ramp rate RR1, as shown in Graph C. This slows the rate of decrease of TIS, and allows the closed-throttle torque of engine 10 (acting through torque converter 16) to pull TIS upward toward the engine idle speed ESi. The control unit 66 monitors TIS relative to the synchronization speed (SYNC) of the target or downshifted speed ratio (indicated by the broken trace in Graph A), and when TIS reaches SYNC at time t3, Ponc is increased from Prs by a pre-defined step increase ΔP, as shown in Graph B. The step increase ΔP is designed to produce sufficient on-coming clutch torque capacity to maintain TIS in coincidence with SYNC, given the expected level of closed-throttle torque and the torque converter characteristics, assuming that the on-coming clutch is, in actuality, filled or nearly filled. When the input synchronization has been maintained for a synchronization interval Tsync at time t4, Ponc is increased to full pressure Pfull to complete the downshift.

While the primary control is able to maintain input speed synchronization (i.e., with no contingent control) in the downshift of FIG. 3, it is possible that shift quality may be improved through adaptive adjustment of one or more of the following: on-coming fill interval Tfill, on-coming return spring pressure Prs, and off-going hold pressure Phold. If the on-coming parameters (Tfill, Prs) are too high, the on-coming clutch will transmit significant torque before TIS reaches SYNC, causing the shift to be unnecessarily harsh. Also, if the off-going parameter (Phold) is too high or too low, the off-going clutch will begin to slip (allowing TIS to rise toward SYNC) too late or too early, respectively, relative to the end of the on-coming clutch fill interval Tfill. In the example of FIG. 3 where the contingent control is not needed, the initial off-going clutch slip might occur later than desired, which would unnecessarily extend the duration of the shift.

Figure 6A:
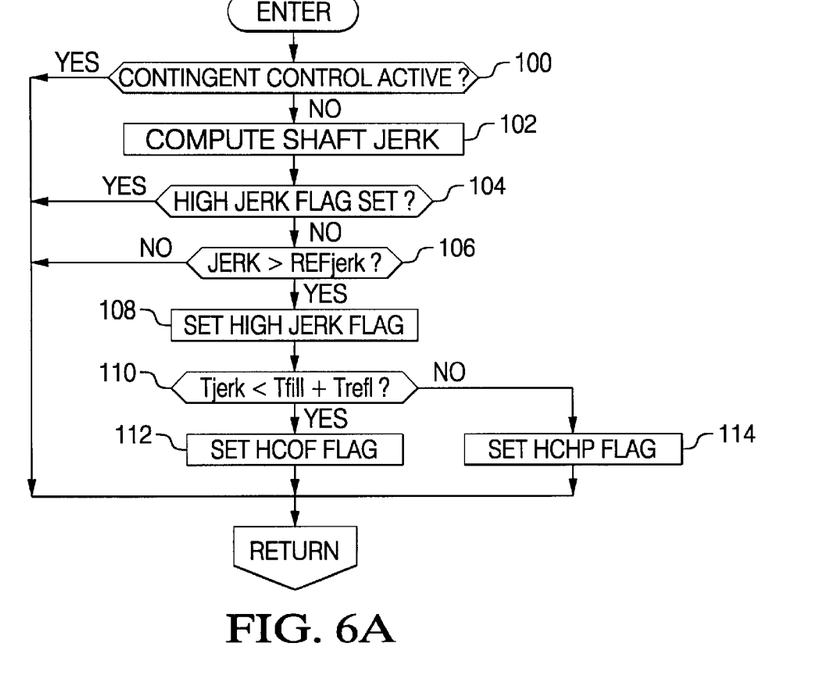
FIGS. 6A, 6B and 6C are flow diagrams of adaptive parameter measurements carried out by the control unit of FIG. 1 according to this invention.

The need for adaptive reduction of the on-coming clutch control parameters (Tfill, Prs) is assessed, according to an aspect of this invention, by monitoring the magnitude and timing of the transmission shaft jerk during the primary control, as illustrated by the flow diagram of FIG. 6A. Referring to FIG. 6A, the control unit 66 periodically computes the transmission shaft jerk so long as only the primary control is active, as indicated at blocks 100 and 102. As will be understood by those skilled in the art, jerk is the second derivative of speed, and may be determined simply by successive numerical differentiation of a measured transmission shaft speed, with appropriate filtering to reduce susceptibility to signal noise. The computed jerk is compared to a reference value REFjerk representative of unacceptably high jerk at block 106, and block 108 sets a HIGH JERK flag if the computed jerk exceeds REFjerk. The time Tjerk at which the high jerk was detected is then compared to a reference time relative to the end of the fill interval Tfill. Specifically, the time Tjerk is compared to the sum (Tfill+Trefl), as noted at block 110. If the time Tjerk occurs prior to (Tfill+Trefl), the block 112 sets the High Capacity Over-Fill (HCOF) flag, indicating that the on-coming clutch fill interval Tfill should be decreased in subsequent similar downshifts. If the time Tjerk occurs after (Tfill+Trefl), the block 114 sets the High Capacity High Pressure (HCHP) flag, indicating that the on-coming clutch pressure Prs should be decreased in subsequent similar downshifts. Once a high level of input shaft jerk has been detected, the block 104 is answered in the negative, so that blocks 106–114 are skipped to preserve the status of the flags for the duration of the shift.

Figure 6B:
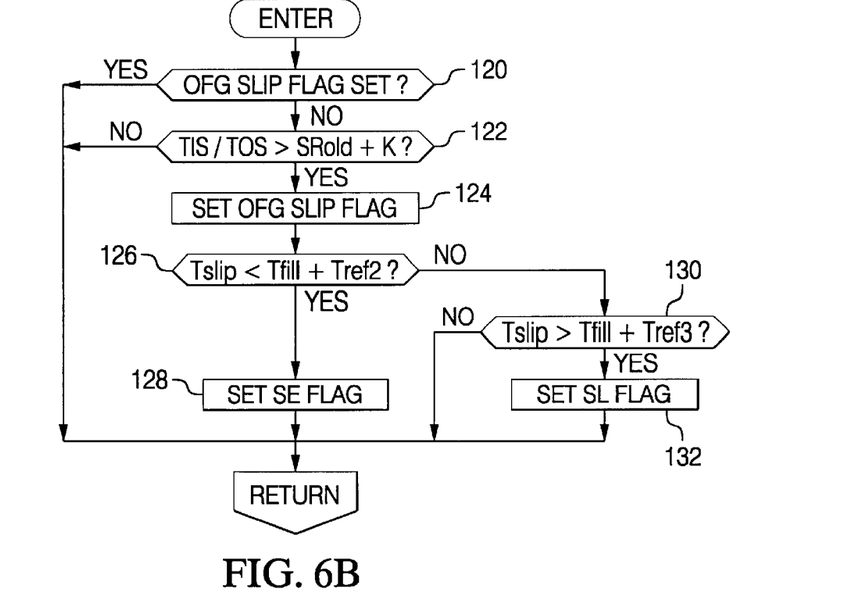

The need for adaptive reduction (or increase) of the off-going clutch control parameter (Phold) is assessed, according to another aspect of this invention, by detecting when the off-going clutch begins to slip, as illustrated by the flow diagram of FIG. 6B. Referring to FIG. 6B, the OFG SLIP flag indicates that slip has been detected. If off-going slip has not been detected, as determined at block 120, the block 122 compares the measured input/output speed ratio TIS/TOS to the sum (SRold+K), where SRold is the nominal value of the old or current speed ratio, and K is a constant. If TIS/TOS exceeds SRold by at least K, off-going clutch slip is detected; when this occurs, block 124 sets the OFG SLIP flag, and block 126 compares the time Tslip of slip detection to a first reference time (Tfill+Tref2). If Tslip occurs prior to (Tfill+Tref2), the off-going hold pressure Phold is too low (slip occurred too early), and the block 128 sets the Slip Early (SE) flag, indicating that Phold should be increased in subsequent similar downshifts. If Tslip occurs after (Tfill+Tref2), block 130 compares Tslip to (Tfill+

Tref3), where Tref3>Tref2. If Tslip occurs after (Tfill+ Tref3), the off-going hold pressure Phold is too high (slip occurred too late), and the block 132 sets the Slip Late (SE) flag, indicating that Phold should be decreased in subsequent similar downshifts. If Tslip falls between (Tfill +Tref2) and (Tfill+Tref3), blocks 126 and 130 are both answered in the negative, and neither the SE flag nor the SL flag is set.

Figure 4:
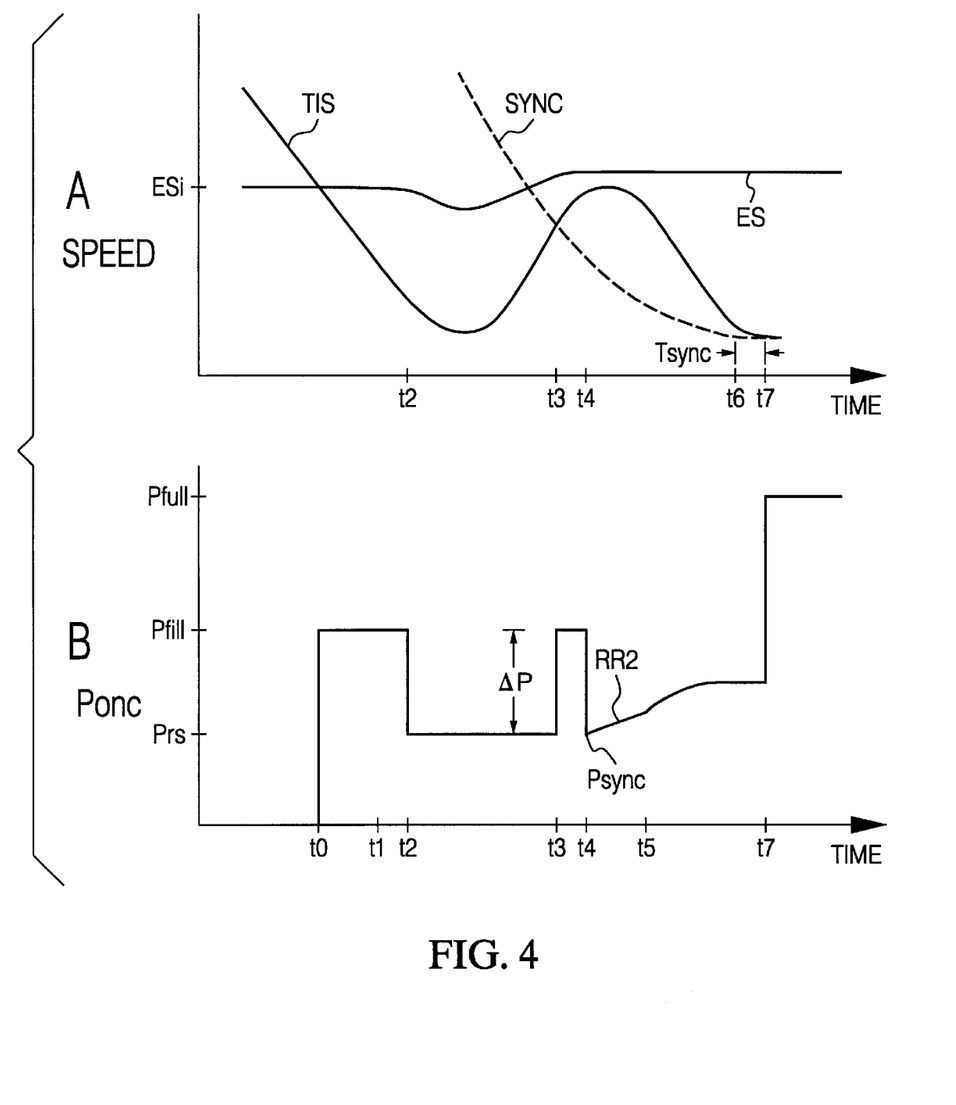
FIG. 4, Graphs A and B, graphically depict a closed-throttle downshift using both primary and contingent on-coming clutch controls.

FIG. 4, Graphs A–B, illustrates a downshift for which the contingent control is activated because the primary control is unable to maintain input speed synchronization. Typically, this condition is due to variations in one or more of the following parameters: on-coming clutch fill time Tfill or pressure Pfill, closed-throttle engine torque, on-coming clutch pressure Prs, and off-going clutch pressure Phold. As in FIG. 3, Graph A depicts both engine speed ES and transmission input speed TIS, and Graph B depicts the commanded on-coming clutch pressure Ponc. When the speed difference (TIS—SYNC)—which mathematically represents the on-coming clutch slippage—exceeds a lower slip threshold THRlower at time t4, the control unit 66 initiates the contingent on-coming clutch control and defers the shift completion step until the input speed synchronization is re-established. Referring to Graph B, the first stage of the contingent control involves immediately lowering Ponc to a computed level Psync, and then increasing Ponc at a determined open-loop ramp rate RR2. The pressure Psync is an on-coming clutch pressure that corresponds to a clutch torque TQcl for producing a desired negative input acceleration TIS_DOT(des), given the transmission input torque TQin. In a preferred embodiment, TQcl is computed based on the dynamic model equation:

$$TQcl=(K1*TIS\_DOT(des))+(K2*TQin) \quad (1)$$

where K1 and K2 are constants. The desired input acceleration TIS_DOT(des) may be a single value, or alternatively, may be dynamically determined based on variations in engine output torque EOT as set forth in the co-pending U.S. patent application Ser. No. 09/528,609. The clutch torque TQcl may be converted to the corresponding pressure Psync using a look-up table of clutch pressure vs. clutch torque for the particular on-coming clutch.

If the first stage of the contingent control produces sufficient on-coming clutch torque capacity to re-establish input speed synchronization, Ponc may be raised to Pfull to complete the shift as soon as synchronization is re-established. However, if the difference (TIS—SYNC) exceeds an upper slip threshold THRupper, the control unit 66 initiates a second stage in which the open-loop ramp rate RR2 is suspended, and a closed-loop pressure adjustment Ponc_CL is added to Ponc. In the example of FIG. 4, this occurs at time t5, and produces sufficient on-coming clutch torque capacity to re-establish input synchronization at time t6. The closed-loop adjustment Ponc_CL is determined by computing an expected input speed TISexp corresponding to the desired input acceleration TIS_DOT(des), delayed to account for the combined electrical and hydraulic delays in producing the commanded on-coming pressure Ponc, and computing a speed error ERR based on the difference between TIS and TISexp.

For example, Ponc_CL may be computed according to the equation:

$$Ponc\_CL=(ERR)*Kp+INT(ERR)*Ki \quad (2)$$

where Kp and Ki are proportional and integral gains, respectively. Once the input synchronization has been maintained for the interval Tsync, Ponc is increased to Pfull to complete the downshift.

Figure 6C:
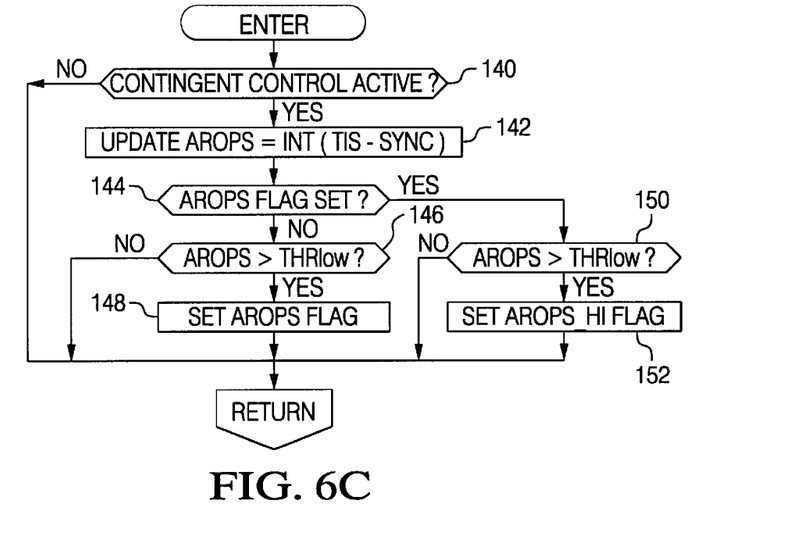

The activation of the contingent control may indicate that on-coming clutch control parameters (Tfill, Prs) were too low, resulting in insufficient on-coming clutch torque capacity to maintain the input speed synchronization. According to an aspect of this invention, the control unit 66 executes a routine while the contingent control is active for judging how much contingent control is required to re-establish input speed synchronization. If only a small amount of contingent control is required, no adaptive adjustment of the on-coming clutch control parameters is indicated; if a large amount of contingent control is required, some adaptive increase of the on-coming clutch control parameters is in order. In the illustrated embodiment set forth in the flow diagram of FIG. 6C, the amount of contingent control required to re-establish input speed synchronization is measured by computing the integral of the on-coming clutch slip (that is, INT(TIS—SYNC)) while the contingent control is active. Referring to FIG. 6C, the block 140 determines if the contingent control is active, and the block 142 computes the on-coming clutch slip integral, referred to herein as AROPS (Angular Rotation of the On-coming clutch Past Sync). If AROPS exceeds a first threshold level THRlow, as determined at block 146, the block 148 sets the AROPS flag. In a subsequent execution of the routine, block 144 detects that the AROPS flag has already been set, and the block 150 is executed to compare AROPS to a second threshold level THRhigh that is higher than THRiow. If AROPS exceeds THRhigh, the block 152 sets the AROPS_HIGH flag.

Graphically, it will be recognized (in reference to Graph A of FIG. 4) that the computed term AROPS represents the area between the TIS and SYNC curves during the contingent control interval t3–t7, and is therefore a valid measure of the amount of contingent control required to re-establish input speed synchronization. Alternatively, the term AROPS may be viewed as a measure of the degree to which the primary control failed to maintain input speed synchronization. In any event, it will additionally be recognized that other measures could be used instead of, or in addition to, the term AROPS. For example, the duration of the contingent control interval t3–t7, or the magnitude of the on-coming clutch slip (TIS—SYNC), could be measured to provide a similar indication.

Figure 7:
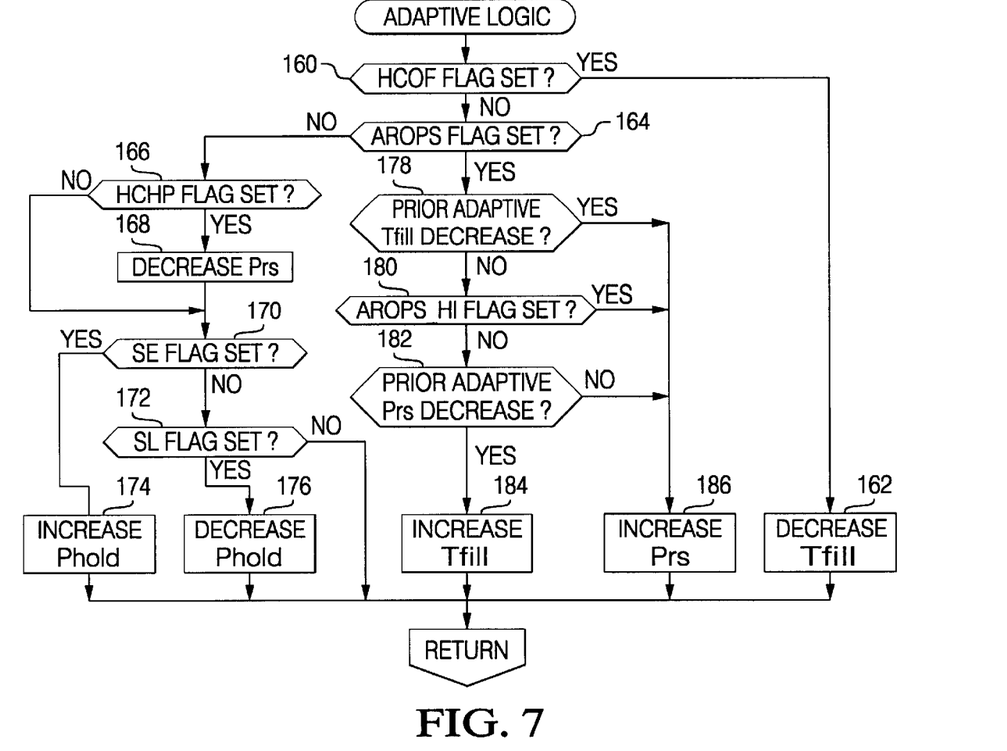
FIG. 7 is a flow diagram of adaptive adjustment logic carried out by the control unit of FIG. 1 according to this invention.

The flow diagram of FIG. 7 depicts an Adaptive Logic routine executed by control unit 66 after shift completion for analyzing the status of the various flags and determining if adaptive adjustment of the clutch control parameters (Tfill, Prs, Phold) is appropriate. The blocks 160 and 162 adaptively decrease Tfill if the HCOF flag is set. If block 164 determines that the AROPS flag is not set (little or no contingent control required), the blocks 166, 168, 170, 172, 174, 176 are then executed to (1) adaptively decrease Prs if the HCHP flag is set, (2) adaptively increase Phold if the SE flag is set, and (3) adaptively decrease Phold is the SL flag is set. If block 164 determines that the AROPS flag is set, the blocks 178, 180, 182, 184, 186 are executed to determine which of the on-coming control parameters Tfill, Prs should be adaptively increased. Blocks 178, 180 and 182 define conditions that indicate that Prs (and not Tfill) should be adaptively increased. If any of the conditions are met, block 186 adaptively increases Prs, leaving Tfill unchanged; if none of the conditions are met, block 184 increases Tfill, leaving Prs unchanged. Essentially, the block 186 is executed to adaptively increase Prs if (1) Tfill had previously been adaptively decreased, or (2) the AROPS_HIGH flag is set, or (3) Prs had not previously been adaptively decreased. Consequently, the block 184 is executed to adaptively increase Tfill if (1) Tfill had not previously been adaptively decreased, and (2) the AROPS_HIGH flag is not set, and (3) Prs had previously been adaptively decreased.

The magnitude of the adaptive adjustments indicated by blocks 162, 168, 174, 176, 184, 186 may be either predetermined or computed based on the deviation of the measured parameter from the respective threshold(s). For example, if the transmission shaft jerk exceeds REFjerk prior to (Tfill+Trefl), the control parameter Tfill may be adaptively decreased by a predetermined amount of time, or by a time determined in relation to the amount by which the measured jerk exceeds REFjerk. An example of a suitable technique for determining whether the adjustment should be incremental (predetermined) or computed is disclosed in the aforementioned U.S. Pat. No. to Runde et al. 5,211,079, which patent is incorporated herein by reference.

Figure 5:
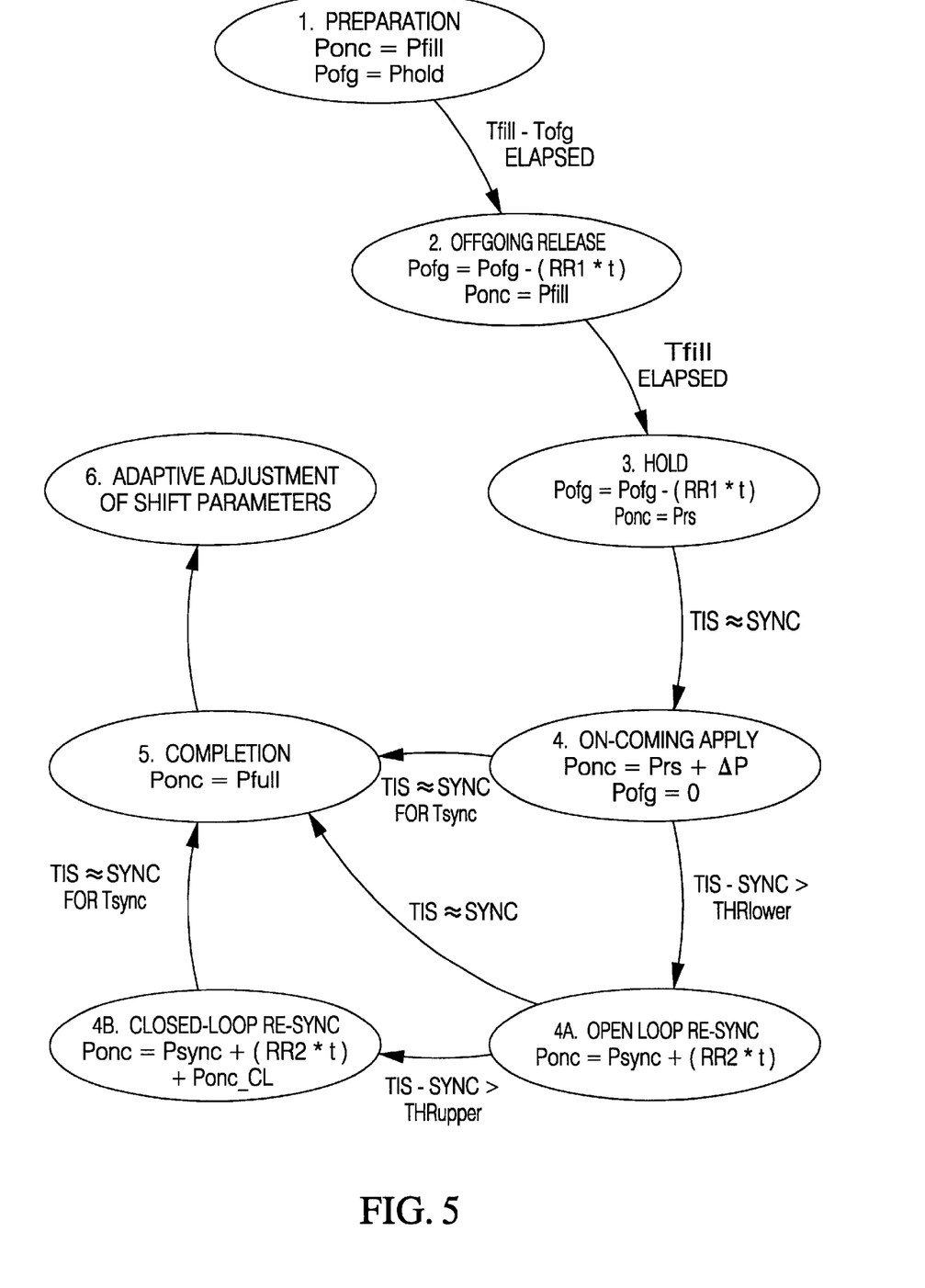
FIG. 5 is a state diagram illustrating a closed-throttle downshift.

FIG. 5 is a state diagram summarizing the above-described on-coming clutch control. The primary on-coming clutch control is characterized as comprising four successively executed states (PREPARATION, OFF-GOING RELEASE, HOLD, and ON-COMING APPLY) followed by a COMPLETION state. In the PREPARATION state, Ponc is set equal to the fill pressure Pfill, and Pofg is set equal to Phold. When the elapsed time reaches (Tfill–Tofg), the control transitions to the OFF-GOING RELEASE state, and Pofg is released at the open-loop ramp rate RR1. When the elapsed time reaches (Tfill), the control transitions to the HOLD state, and Ponc is set equal to Prs. When TIS substantially reaches SYNC, the control transitions to the ON-COMING APPLY state; at such point, Ponc is adjusted upward by the step increase ΔP, and Pofg is set to zero. If the input speed synchronization is maintained for the interval Tsync, the control transitions to the COMPLETION state in which Ponc is set equal to Pfull, completing the downshift.

The contingent on-coming clutch control is characterized as comprising the states 4A and 4B, respectively designated as OPEN LOOP RE-SYNC and CLOSED-LOOP RE-SYNC. The control transitions from ON-COMING CLUTCH APPLY to OPEN-LOOP RE-SYNC if the primary clutch control is unable to maintain input synchronization and the difference (TIS—SYNC) exceeds THRlower. In such case, Ponc is determined according to the sum (Psync+ RR2*t), where t is the accumulated time in state 4A and Psync is the pressure corresponding to the clutch torque TQcl computed according to equation (1). If the on-coming pressure provided by state 4A is sufficient to re-establish input speed synchronization, the control transitions to COMPLETION (state 5) when TIS substantially reaches SYNC. Otherwise, the control transitions to CLOSED-LOOP RE-SYNC when the difference (TIS—SYNC) exceeds THRupper. In such case, Ponc is determined according to the sum [Psync+(RR2*t)+Ponc_CL], where t is the accumulated time in state 4A, and Ponc_CL is the closed-loop adjustment computed according to equation (2). When TIS is substantially equal to SYNC for the synchronization interval Tsync, the control transitions to COMPLETION to complete the downshift. Following COMPLETION, the control transitions to the final state, ADAPTIVE ADJUSTMENT OF SHIFT PARAMETERS, which corresponds to the Adaptive Logic flow diagram of FIG. 7, described above.

In summary, the control of this invention carries out a downshift using closed-throttle engine torque, with primary and contingent controls for completing the shift with minimum driveline torque disturbance, and adaptive adjustment of the control parameters based on shift quality measurements made during the shift. The fill time or the maintenance pressure of the oncoming clutch is adaptively decreased for reduced driveline disturbance in subsequent shifts of the same type if the transmission shaft jerk during the primary control exceeds a threshold. On the other hand, the fill time or the maintenance pressure of the on-coming clutch is adaptively increased based on a measure of the effort required by the contingent control for reduced dependence on the contingent control in subsequent shifts of the same type if the measured effort exceeds a threshold amount. Finally, the off-going clutch release control is adaptively adjusted based on the initiation of off-going clutch slippage relative to the on-coming clutch fill interval for improved on-coming and off-going clutch coordination.

While described in reference to the illustrated embodiment, it will be understood that various modifications in addition to those mentioned above will occur to those skilled in the art. For example, adaptive adjustment of the on-coming clutch fill may be achieved by adjusting the fill pressure Pfill or the nominal clutch volume used to calculate Tfill, depending on the application. Other application-dependent variations are also possible. Accordingly, it will be understood that controls incorporating these and other modifications may fall within the scope of this invention, which is defined by the appended claims.

What is claimed is:

1. A clutch control method for downshifting a vehicle automatic transmission to a target speed ratio, the transmission having an input shaft coupled to receive closed-throttle output torque from an internal combustion engine during a period of vehicle deceleration, and an off-going clutch that is released when the input shaft is below an idle speed of the engine, allowing the closed-throttle output torque to raise the input speed to a synchronous speed of the target speed ratio, and an on-coming clutch that is engaged to complete the shift, the method comprising the steps of:

carrying out a primary clutch control by: (1) filling the on-coming clutch for a fill period in preparation for engagement, and (2) supplying a maintenance pressure to the on-coming clutch to maintain it in readiness for engagement;

during the primary clutch control: (1) computing a transmission shaft jerk, (2) comparing the computed jerk to a threshold, and (3) indicating an over-fill or an over-pressure condition if the computed jerk exceeds the threshold;

engaging the on-coming clutch to complete the shift; and upon completion of the shift, adaptively decreasing the fill period for a subsequent shift if the over-fill condition is indicated, and adaptively decreasing the maintenance pressure of a subsequent shift if the over-pressure condition is indicated.

2. The method of claim 1, wherein the over-fill condition is indicated if the computed jerk exceeds the threshold before a reference time determined in relation to the fill period, and the over-pressure condition is indicated if the computed jerk exceeds the threshold after the reference time.

3. The method of claim 1, wherein the primary clutch control (1) reduces a pressure supplied to the off-going clutch to a hold value, and (2) further reduces the pressure supplied to the off-going clutch to gradually release the off-going clutch, and the method includes the steps of:

detecting a time of initial off-going clutch slippage relative to a time interval defined in relation to the fill period of the on-coming clutch; and upon completion of the shift, adaptively increasing the hold value if the detected time occurs prior to the defined time interval, and adaptively decreasing the hold value if the detected time occurs after the defined time interval.

4. A clutch control method for downshifting a vehicle automatic transmission to a target speed ratio, the transmission having an input shaft coupled to receive closed-throttle output torque from an internal combustion engine during a period of vehicle deceleration, and an off-going clutch that is released when the input shaft is below an idle speed of the engine, allowing the closed-throttle output torque to raise the input speed to a synchronous speed of the target speed ratio, and an on-coming clutch that is engaged to complete the shift, the method comprising the steps of:

carrying out a primary clutch control by: (1) filling the on-coming clutch for a fill period in preparation for engagement, (2) supplying a maintenance pressure to the on-coming clutch to maintain it in readiness for engagement, and (3) raising the pressure supplied to the on-coming clutch by an amount designed to maintain the input speed in coincidence with the synchronous speed once the input speed reaches the synchronous speed;

during the primary clutch control: (1) computing a transmission shaft jerk, (2) comparing the computed jerk to a threshold, and (3) indicating an over-fill or an over-pressure condition if the computed jerk exceeds the threshold;

carrying out a contingent clutch control in response to a detected inability of the primary clutch control to maintain the input speed in coincidence with the synchronous speed, by controlling the pressure supplied to the on-coming clutch to re-establish coincidence between the input speed and the synchronous speed;

determining a measure of an effort required by the contingent clutch control to re-establish coincidence between the input speed and the synchronous speed;

engaging the on-coming clutch to complete the shift; and upon completion of the shift, adaptively increasing one of the fill period and the maintenance pressure if the measure of the effort required by the contingent control exceeds a first threshold level, adaptively decreasing the fill period for a subsequent shift if the over-fill condition is indicated, and adaptively decreasing the maintenance pressure of a subsequent shift if the over-pressure condition is indicated.

5. The method of claim 4, wherein the step of determining a measure of the effort required by the contingent clutch control comprises the steps of:

determining a slip speed of the on-coming clutch while the contingent control is being carried out; and integrating the determined slip speed to form the measure of the effort required by the contingent control.

6. The method of claim 4, including the step of:

adaptively increasing the maintenance pressure if the measure of the effort required by the contingent control exceeds a second threshold level that is higher than the first threshold level.

7. A clutch control method for downshifting a vehicle automatic transmission to a target speed ratio, the transmission having an input shaft coupled to receive closed-throttle output torque from an internal combustion engine during a period of vehicle deceleration, and an off-going clutch that is released when the input shaft is below an idle speed of the engine, allowing the closed-throttle output torque to raise the input speed to a synchronous speed of the target speed ratio, and an on-coming clutch that is engaged to complete the shift, the method comprising the steps of:

carrying out a primary clutch control by: (1) filling the on-coming clutch for a fill period in preparation for engagement, (2) supplying a maintenance pressure to the on-coming clutch to maintain it in readiness for engagement, and (3) when the input speed reaches the synchronous speed, raising the pressure supplied to the on-coming clutch by an amount designed to maintain the input speed in coincidence with the synchronous speed;

carrying out a contingent clutch control in response to a detected inability of the primary clutch control to maintain the input speed in coincidence with the synchronous speed, by controlling the pressure supplied to the on-coming clutch to re-establish coincidence between the input speed and the synchronous speed;

determining a measure of an effort required by the contingent clutch control to re-establish coincidence between the input speed and the synchronous speed; and upon completion of the shift, adaptively increasing one of the fill period and the maintenance pressure if the measure of the effort required by the contingent control exceeds a first threshold level.

8. The method of claim 7, wherein the primary clutch control (1) reduces a pressure supplied to the off-going clutch to a hold value, and (2) further reduces the pressure supplied to the off-going clutch to gradually release the off-going clutch, and the method includes the steps of:

detecting a time of initial off-going clutch slippage relative to a time interval defined in relation to the fill period of the on-coming clutch; and upon completion of the shift, adaptively increasing the hold value if the detected time occurs prior to the defined time interval, and adaptively decreasing the hold value if the detected time occurs after the defined time interval.

9. The method of claim 7, wherein the step of determining a measure of the effort required by the contingent clutch control comprises the steps of:

determining a slip speed of the on-coming clutch while the contingent control is being carried out; and integrating the determined slip speed to form the measure of the effort required by the contingent control.

10. The method of claim 7, including the step of:

adaptively increasing the maintenance pressure if the measure of the effort required by the contingent control exceeds a second threshold level that is higher than the first threshold level.

\* \* \* \* \*